United States Patent
Cosman (10) Patent No.: US 6,816,169 B2
(45) Date of Patent: Nov. 9, 2004

(54) SYSTEM AND METHOD FOR RUN-TIME INTEGRATION OF AN INSET GEOMETRY INTO A BACKGROUND GEOMETRY

(75) Inventor: Michael A. Cosman, South Jordan, UT (US)

(73) Assignee: Evans & Sutherland Computer Corporation, Salt Lake City, UT (US)

(*) Notice: Subject to any disclaimer, the term of this patent is extended or adjusted under 35 U.S.C. 154(b) by 47 days.

(21) Appl. No.: 10/268,528

(22) Filed: Oct. 9, 2002

(65) Prior Publication Data

US 2004/0070587 A1 Apr. 15, 2004

(51) Int. Cl.$^7$ ................................................ G09G 5/00
(52) U.S. Cl. ....................................... 345/611; 348/586
(58) Field of Search ................................ 348/597, 611, 348/616, 618, 421, 441, 443, 620

(56) References Cited

U.S. PATENT DOCUMENTS

| | | | | |
|---|---|---|---|---|
| 4,616,262 A | * | 10/1986 | Toriumi et al. | 348/597 |
| 4,885,703 A | * | 12/1989 | Deering | 345/422 |
| 5,359,526 A | | 10/1994 | Whittington et al. | 364/443 |
| 5,377,320 A | * | 12/1994 | Abi-Ezzi et al. | 345/502 |
| 5,630,037 A | * | 5/1997 | Schindler | 345/592 |
| 6,195,609 B1 | | 2/2001 | Pilley et al. | 701/120 |
| 6,262,739 B1 | | 7/2001 | Migdal et al. | 345/423 |
| 6,307,558 B1 | | 10/2001 | Mao | 345/428 |

OTHER PUBLICATIONS

Foley, van Dam, Feiner, Hughes; "Computer Graphics: Principles and Practice, Second Edition in C"; Addison-–Wesley Publishing Company, Inc., pp 929–945.*
Carter, Gil; "Re: Re seams and creaseAngle (long)"; posted on the GeoVRML.org website; Feb. 02, 2000; http://www-.geovrml.org/archive/msg00560.html.*
Tanner, Migdal, Jones; "The Clipmap: A Virtual Mipmap"; Silicon Graphics Computer Systems; date unkown.*

* cited by examiner

Primary Examiner—Matthew C. Bella
Assistant Examiner—Alysa N. Brautigam
(74) Attorney, Agent, or Firm—Thorpe North & Western LLP (57) ABSTRACT

The invention provides a method for integrating an inset geometry within a background geometry. The method comprises the step of identifying a perimeter of the inset geometry. A further step is extending a skirt, having an outer perimeter and an inner perimeter, from the perimeter of the inset geometry out over the background geometry. An additional step is removing portions of the background geometry that are covered by the inset geometry and skirt. Another step is modifying the skirt so that the outer perimeter of the skirt matches background geometry behavior and the inner perimeter matches inset geometry behavior and a continuous transition exists between the outer perimeter and the inner perimeter.

7 Claims, 7 Drawing Sheets

SYSTEM AND METHOD FOR RUN-TIME INTEGRATION OF AN INSET GEOMETRY INTO A BACKGROUND GEOMETRY

FIELD OF THE INVENTION

The present invention relates generally to computer graphics. More particularly, the present invention relates to run-time integration of an inset geometry into a background geometry.

BACKGROUND

Computers have been used for many years to do image and graphics generation. In recent years computer generated graphics have become more sophisticated and the power of computer equipment has increased. Similarly, users' expectations of computer graphics have also increased. Computer users have come to expect more realism in computer graphics which generally means that there are more objects, and more light and texture processing on those objects.

Complex images and scenes are mathematically modeled in a three-dimensional space in the computer memory and manipulated accordingly. These three-dimensional mathematical models are called wire frames because all the edges of the object are visible at the same time when displayed. Three-dimensional models are made to look more realistic by removing the edges which should be hidden and by applying color and shading to the visible surfaces of the model. Texture also improves a simple polygon model by adding opacity and color variations.

Figure 1:
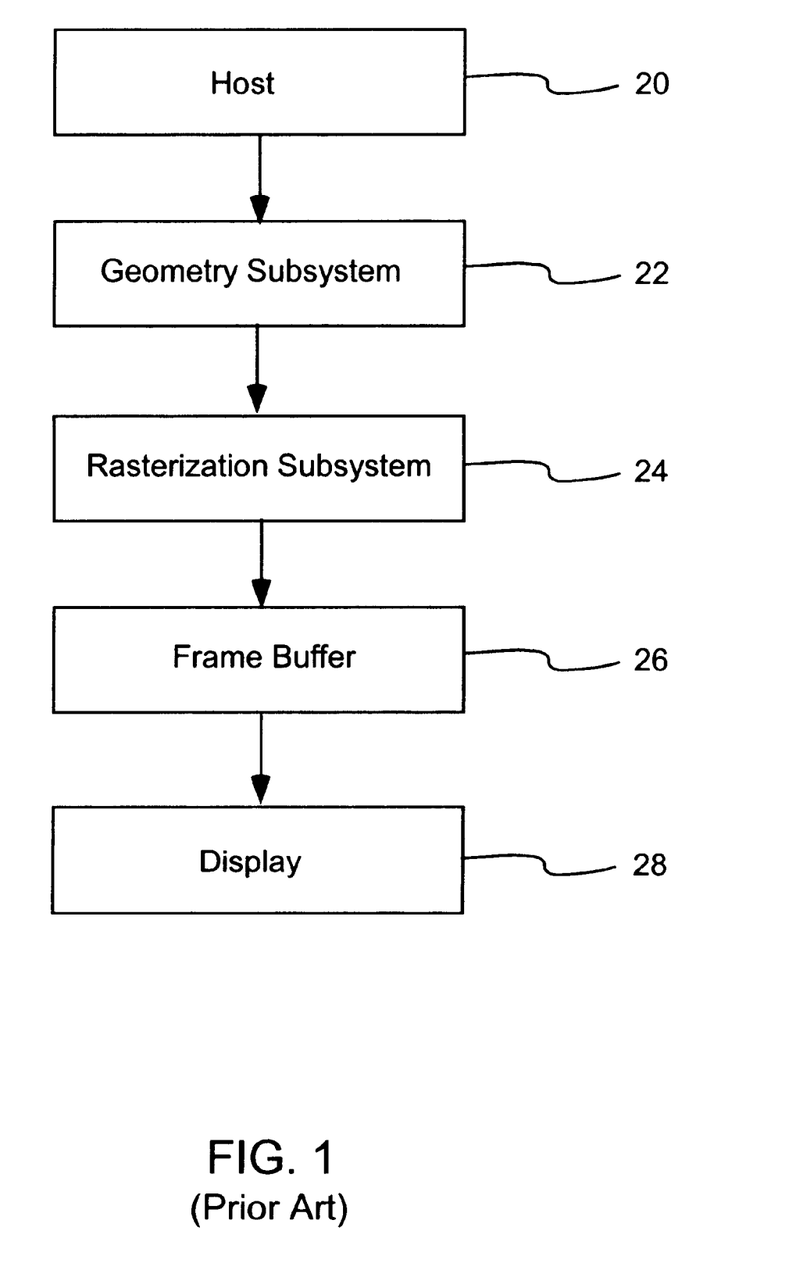
FIG. 1 is a block diagram of a computer graphics system.
Figure 2:
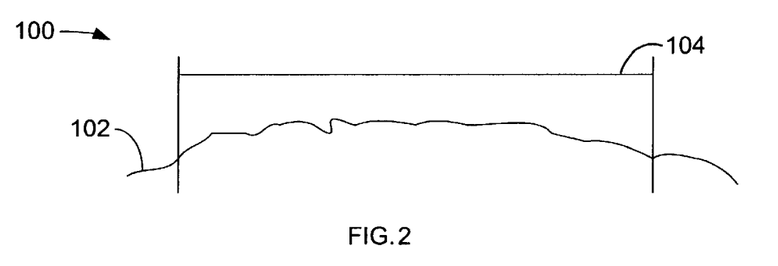
FIG. 2 illustrates a cross-sectional side-view of geometry to be selected within the background geometry in an embodiment of the present invention.

In order to provide a better understanding of computer graphics architecture, a generalized computer graphics system will now be discussed. In FIG. 1, a host processor 20 is provided to process a display model or database. The host processor is connected to a geometry subsystem 22, which transforms object coordinate polygon data to the world coordinate system. The geometry system can also take care of lighting, viewing transformation and mapping to screen coordinates. The rasterization subsystem 24 converts transformed primitives to pixels and subpixels. Rasterization includes scan conversion, visible-surface determination and shading. Each pixel and/or subpixel is typically assigned an X and Y coordinate, a RGBA (i.e., Red, Green, Blue, Alpha) color value and a Z-value. The pixels are stored in a frame buffer 26 and then output to a display 28.

One element of a computer graphics system that is particularly relevant to the present discussion is the geometry subsystem. This is where the world model is processed and the transformation of the model will take place. Typically, the world model that is supplied to the geometry subsystem is fixed at run-time and the entire database that represents the scene geometry is compiled in advance. Up to this point in time, models or databases have only practically been modifiable at compile time and any insertion to the system model has been a compile time operation that involves reconstructing the model. This process is time consuming and can take anywhere from an hour up to several hours.

An example of a computer graphics application that has used compiled modeling techniques is high performance vehicle simulation. Such a simulation system may often include a cab that is a vehicle mock-up containing a crew compartment with vehicle instruments and controls. The cab can be mounted on a motion base to provide motion and acceleration cues by moving the cab. The motion base is coupled to a visual system, which provides out-the-window imagery and environmental data for the crew, host, or both.

A software system called the host oversees the operation of the simulator. The host monitors the control inputs provided by the crew, and causes the cockpit dials, instruments and displays to reflect the ongoing simulation status. In addition, the host controls the motion base and related audio systems, and tells the visual system what it needs to know to draw the corresponding out-the-window scene. A real-time system is a software program within the visual system that controls the image generator in response to host inputs.

The host tells the real-time system about object positions in the simulated environment (e.g., own aircraft, traffic aircraft, ground traffic, storms, etc.), the status of switchable or selectable items (e.g., runway and environmental lights, runway contamination, etc.), and position of global environmental effects like illumination (e.g., day, dusk, night) and visibility (e.g., fog, rain, snow, etc.). The real-time system returns data such as the nature of the surface beneath the tires of the aircraft, and whether collisions have occurred between the aircraft and other traffic or storm cells. This communication is largely asynchronous which means it occurs randomly as needed and is not locked to the ongoing computation of regular image frames. A simulation system can also contain many different types of scene elements such as terrain, aerials or tree canopies, linear features (roads, hedgerows, fences), and point features (trees, power poles, houses, light points). Other models can be included in the system such as moving models of airplanes, cars, and helicopters, or environmental models such as clouds, sky, storms, or lightning flashes, etc.

The real-time system gets the required scene data from disk storage and loads it into the appropriate parts of the image generator in an on-going background process called paging. It also sends commands to the image generator to implement lighting, environmental, and other special effects called for by the host. The real-time system determines the proper level-of-detail (LOD) for scene elements and prepares them for rendering after eliminating elements that will not appear in the scene. This process includes the translations and rotations needed to get scene elements into their proper position within the scene. In other words, the real-time system controls the geometry engine and provides the input needed to allow the scene to be viewed and transformed. Further, the real-time system also manages the rendering portion of the image generator in a synchronous, lock-step fashion that guarantees a steady stream of video to the displays.

SUMMARY OF THE INVENTION

The invention provides a method for integrating an inset geometry within a background geometry. The method comprises the step of identifying a perimeter of the inset geometry. A further step is extending a skirt, having an outer perimeter and an inner perimeter, from the perimeter of the inset geometry out over the background geometry. An additional step is removing portions of the background geometry that are covered by the inset geometry and skirt. Another step is modifying the skirt so that the outer perimeter of the skirt matches background geometry behavior and the inner perimeter matches inset geometry behavior and a continuous transition exists between the outer perimeter and the inner perimeter.

Additional features and advantages of the invention will be apparent from the detailed description which follows, taken in conjunction with the accompanying drawings, which together illustrate, by way of example, features of the invention.

DETAILED DESCRIPTION

Reference will now be made to the exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention.

In the past, computer graphics modeling has not included the ability to dynamically incorporate geometry elements at run-time into background geometry or a global geometry. One problem to be overcome in order to directly incorporate an additional piece of geometry into the background geometry is that the inset geometry needs to know specific things about the background geometry in order to be arranged, clipped and combined with the background geometry. The computations required to correctly insert an inset geometry into a background geometry are complex and time consuming. Thus, these computations have been performed in the past at compile time. In addition, there is a quantization or sampling problem that can occur at the boundary of an inset geometry that is being added to the background geometry. The quantization problems can create visual anomalies and cracks at boundaries between the inset geometry and the background geometry. The present invention overcomes these problems and allows an inset geometry to be included in a background geometry in real time.

The present invention discloses a video graphics display system that is able to merge a smaller inset geometry at run time into a larger background geometry. The inset geometry can replace a section of the background geometry and a gradual transition from the geometric behavior of the larger section to the geometric behavior of the smaller section is achieved in an advantageous way. The transition allows a composite geometry created from the two separate geometries to be visually continuous and to avoid cracks between the two geometries during display. The relative positions of the inset geometry and larger background geometry need not be known until run time in the present invention.

Visual continuity of the newly formed composite geometry is achieved, in part, by constructing a "skirt" around the perimeter of the inset geometry. The skirt comprises a set of polygons that extend from the perimeter of the inset geometry outward a given distance. The distance of the skirt between the inset geometry and the background geometry need not be constant in all directions. Skirt polygons have vertices that are completely and exactly coincident with the inset geometry along the perimeter of the inset. This method and system can be implemented within the computer graphics pipeline or in more specific embodiments in the geometry subsystem.

The present invention will be described more generally in relation to FIGS. 2–5 and then further details will be discussed later along with FIGS. 6–10. The addition of an inset geometry into a background geometry typically means that the background geometry model will have a certain geometric portion removed, as required for each specific situation. An example of an insert being made into background geometry is shown in FIGS. 2–5. The term background geometry is generally used here to mean a larger geometry or a global geometry within which a smaller geometry can be inset or inserted. In terms of the present invention, this means a smaller piece of inset geometry can be inserted into a larger piece of background geometry in real time without requiring a recompilation of the entire geometry model database. For example, an airport, army base, city, or any group of buildings can be inserted into a larger terrain. On a smaller scale, a crater or destroyed building portion can be inserted into the geometry of a building, dam, or group of buildings. The background geometry can also be described as the primary geometry or global geometry.

FIGS. 2–5 illustrate the process of incorporating a new inset geometry within a background geometry. For example, a terrain 100 may be the background geometry. Alternatively, the background geometry might be a building, dam, or mountain that incorporates a geometric displacement (e.g. by an explosion) and requires new inset geometry. Another situation that might require dynamic inset geometry would be a changing geometry, such as bulldozer making cuts to the landscape in real time. In the case of an airport on mostly smooth or level terrain, the inset geometry can be the portion of the geometry inside the airport fence. For more complex images or models that involve insets on cuts and fills, some additional surrounding terrain may be included.

Figure 3:
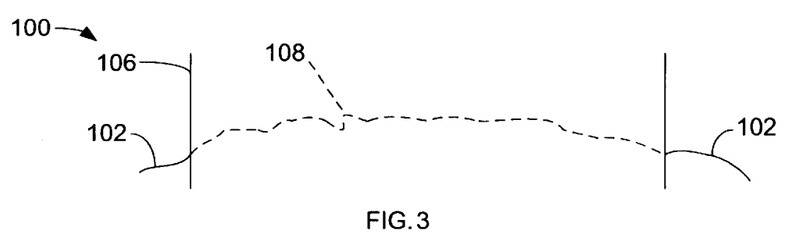
FIG. 3 illustrates a side view of the formation of an opening or hole where the inset geometry is to be inserted in the background geometry.
Figure 4:
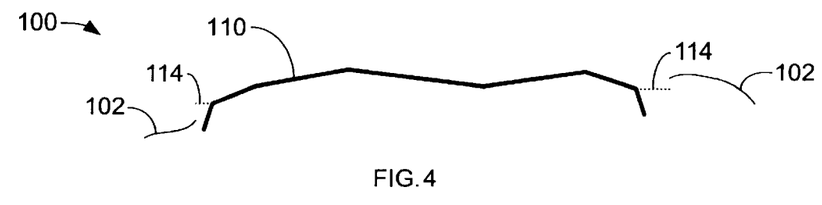
FIG. 4 illustrates the insertion of the inset geometry within the background geometry as embodied according to the present invention.

The model with a portion removed 108 is shown in FIG. 3 and it requires additional geometry and control information. One or more polygons are used to define the footprint of the inset geometry. The footprint is used to define an opening cutter 104 (FIG. 2) used to cut a hole or opening 106 in the background geometry 102 or global geometry. For example, the opening cutter can define an area of a terrain hole to accommodate an inset geometry 110, as in FIG. 4. The cutting can be implemented by a hierarchical suppression of geometry facets based on whether they are completely surrounded by the hole cutter 104 or implemented in other ways known to those skilled in the art. During the defining of the cutter footprint and the cutting of the background geometry, polygon facets that are not completely surrounded by the cutter (that straddle the cutter boundary)

are divided into polygon fragments by the cutter boundary so that all the background polygons will be either in or out of the cutter boundary.

Figure 5:
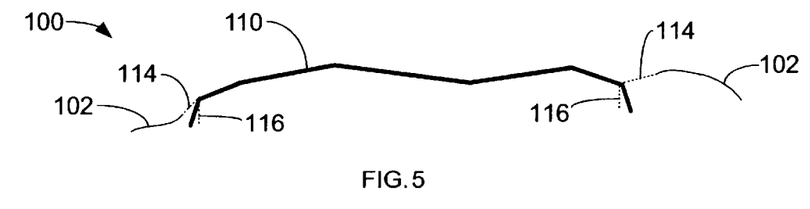
FIG. 5 depicts the skirt mapping and coordination between the background geometry and the inset geometry as embodied in the present invention.

A skirt of polygons 114 around the perimeter of the inset geometry is created so the outside vertices conform to the background geometry and the inside vertices are coincident with the inset geometry 110, as shown in FIG. 5. The outside skirt vertices are shared with the vertices of the hole cutter 104. The skirt 114 is conformed to the background around the skirt's outside perimeter, and the skirt is conformed by clipping it to the underlying background polygons. This creates additional vertices along the inside edge of the skirt, where the skirt joins the inset geometry. These additional vertices lie geometrically along the original, unclipped inside edges of the skirt. Other, additional vertices created during the clipping operation that lie between the inside and outside edges of the skirt get a blend of behavior between the inside and outside skirt vertices.

Figure 6:
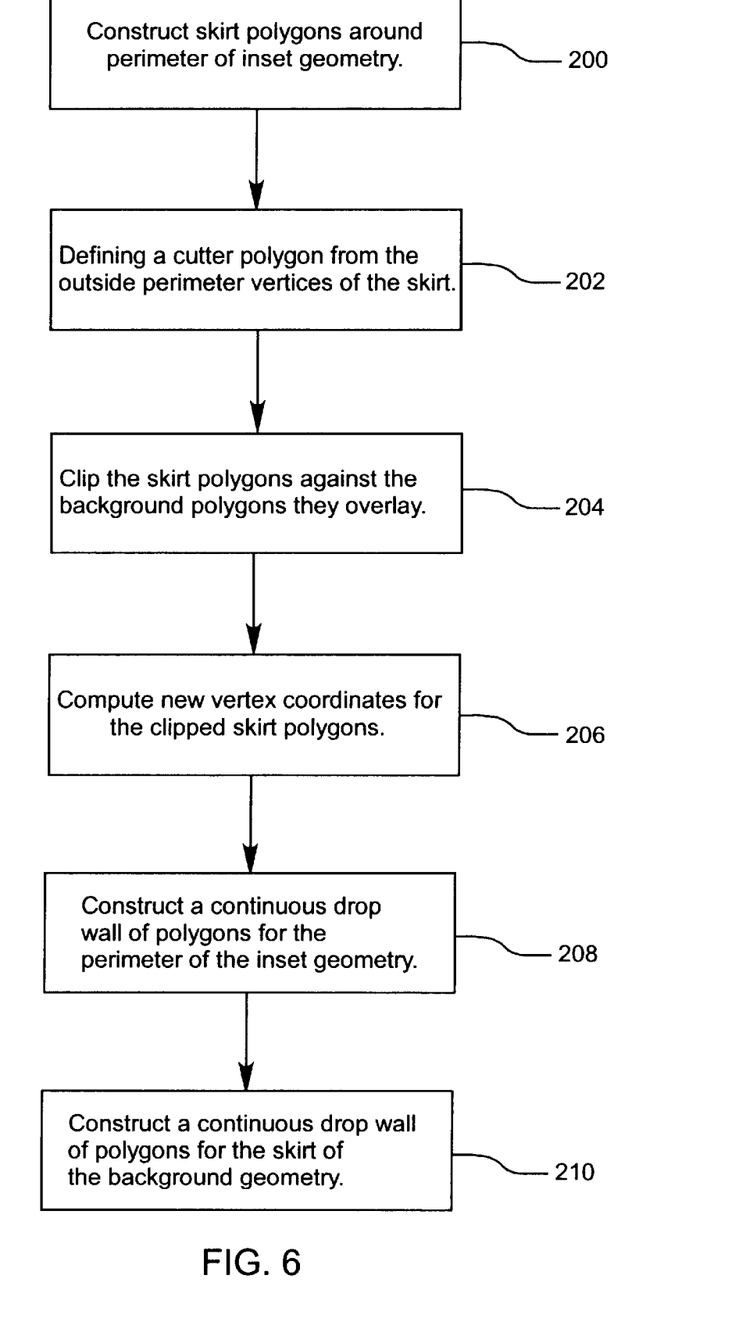
FIG. 6 depicts a flow diagram of a method for incorporating an inset geometry into a background geometry according to an embodiment of the present invention.

Now that the invention has been described generally, further details will be presented with respect to the method for the invention. FIG. 6 illustrates a flow chart depicting operations performed in an embodiment of the invention. A skirt is constructed around the perimeter of the inset geometry in block 200. The skirt polygons extend outward from the inset geometry a pre-selected distance that is not necessarily constant in all directions. This skirt shares vertices completely and exactly with the inset geometry along the perimeter of the inset. The combination of the inset geometry with the skirt creates an extended inset.

Figure 7:
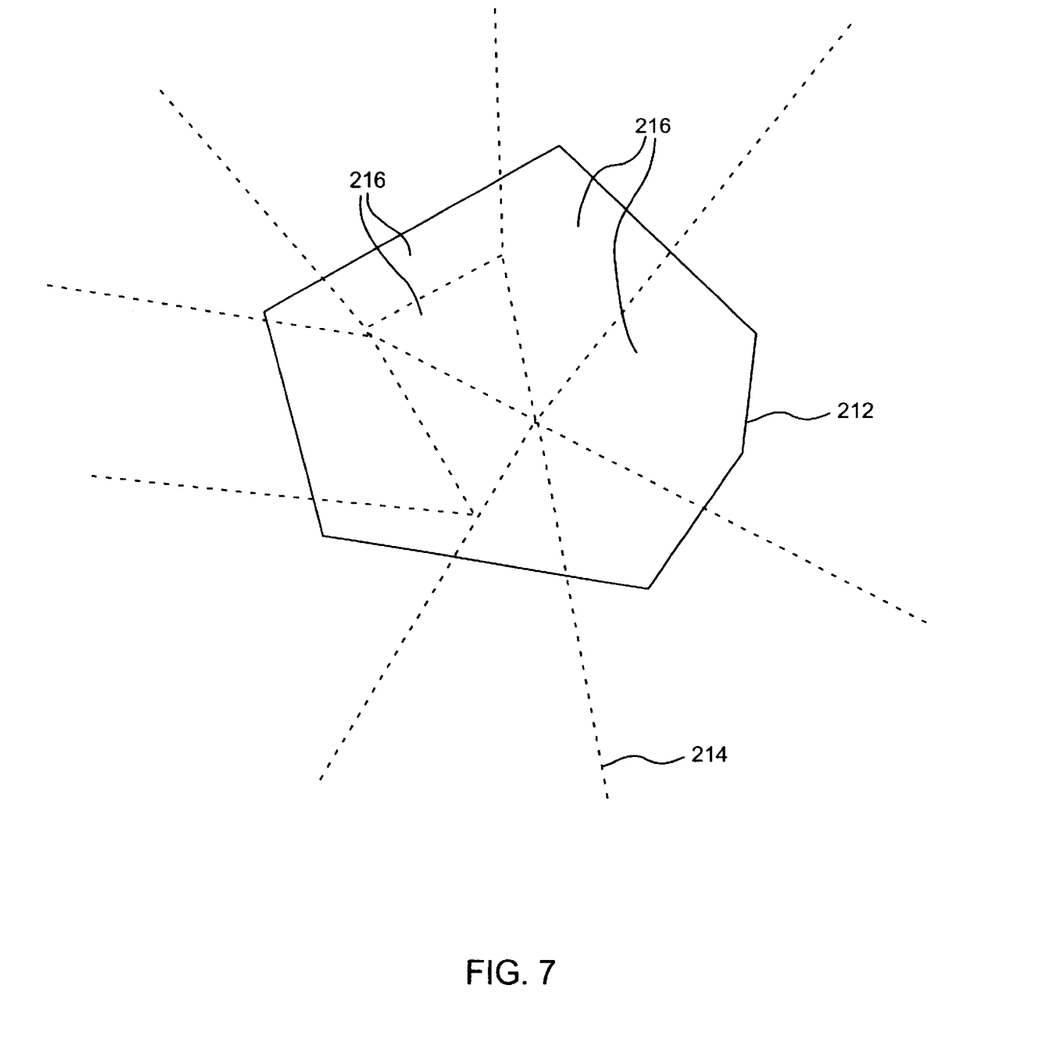
FIG. 7 illustrates a cutter polygon overlaid on a background geometry.

Next, the portion of the background geometry overlaid by the extended inset is removed. This is done by constructing a cutter polygon or polygons from the outside perimeter vertices of the skirt in block 202. The cutter polygon 212 is illustrated in FIG. 7 as it overlays the background geometry 214. The cutter polygon is clipped into a contiguous mesh of cutter fragments 216, where each fragment is wholly and exactly contained within a background polygon of the background geometry that it overlays and is geometrically coplanar with its associated background polygon. The initial cutter polygon is not necessarily in a plane and it will be divided into polygons or triangles to match the actual background geometry. In addition, the cutter polygon may be applied by rendering it into the pixel frame buffer as a stencil mask to remove background polygons and portions of background polygons covered by the cutter.

In the embodiment described, there is a "projection direction" of the cutter polygon 212 onto the background polygons 214. For background geometry, such as a simulated terrain, the cutter polygons are projected vertically onto the background geometry and clipped against vertical clip planes defined by the edges of the underlying background polygons.

Figure 8:
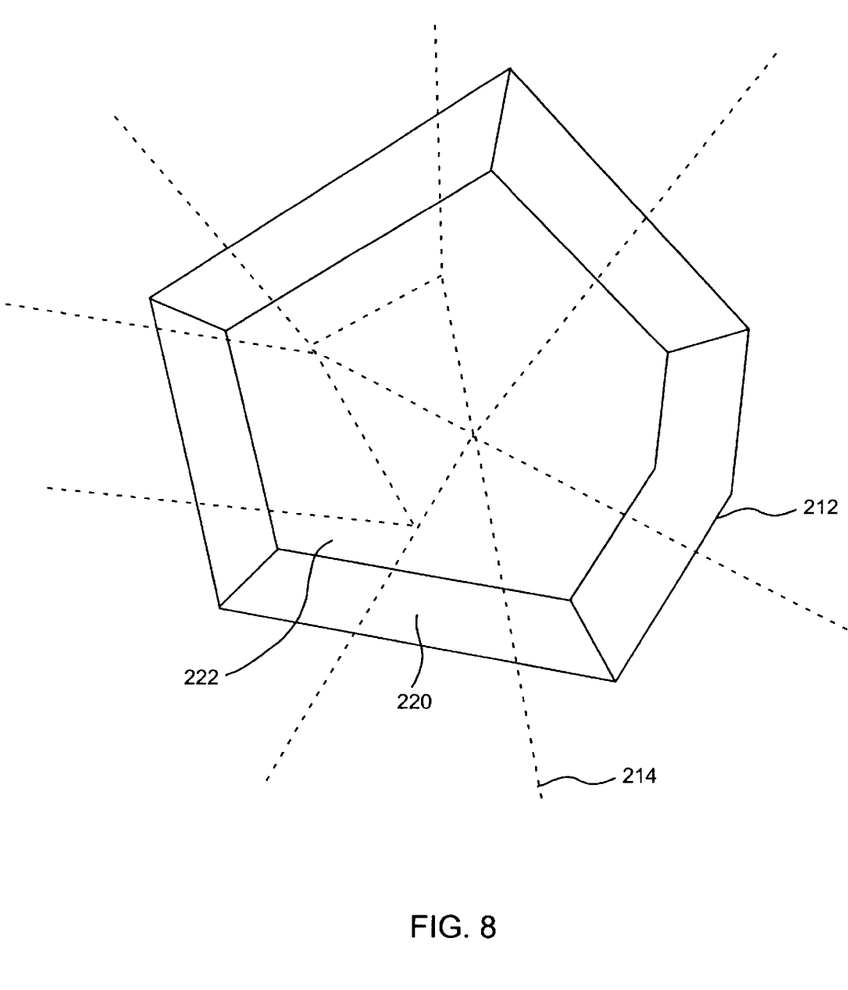
FIG. 8 illustrates a skirt surrounding an inset geometry as overlaid on the previous background geometry.

Each cutter fragment can then be associated with the background polygon it overlays so that subsequent graphics operations can properly apply cutters to background polygons in stencil-like operations. In addition, any background polygon that is completely surrounded by a cutter can be discarded, along with its overlaid cutter polygon, reducing subsequent processing and rendering effort. FIG. 8 illustrates that the application of the cutter polygon 212 generates a hole or opening in the background geometry that is precisely the shape of the geometry of the inset geometry 222 and the skirt 220 to be inserted. The size of the geometry removed by the cutter polygon is greater than the inset geometry to allow for the skirt. This means that the inset geometry does not need to know the details about the background geometry and the skirt can act as a geometric blend region. In addition, the inset geometry does not need to be clipped because the skirt will be matched to the inset geometry along their shared perimeter. Avoiding clipping the inset geometry reduces the complexity of inserting any given inset geometry into the background geometry. In this process, neither the background nor the inset geometry are modified which is a valuable advantage of the present invention.

The hole cutting technique is designed to utilize the largest possible cutter polygons in order to maximize the ability to detect and discard background geometry facets that are wholly within the region of interest. If multiple cutter polygons are utilized, it is preferable (although not required) that they form a contiguous tiling of the area to be removed or suppressed, with complete vertex sharing. The system need not be able to discern all geometry facets that can be completely removed should they be covered by the collective effects of several cutter polygons. As such, it is more effective when the system utilizes a single convex cutter polygon, even if it requires a large number of vertices. It is more efficient to discard a completely covered background polygon than to render it (along with an associated cutter polygon) and then erase it pixel-by-pixel with a stencil operation.

Figure 9:
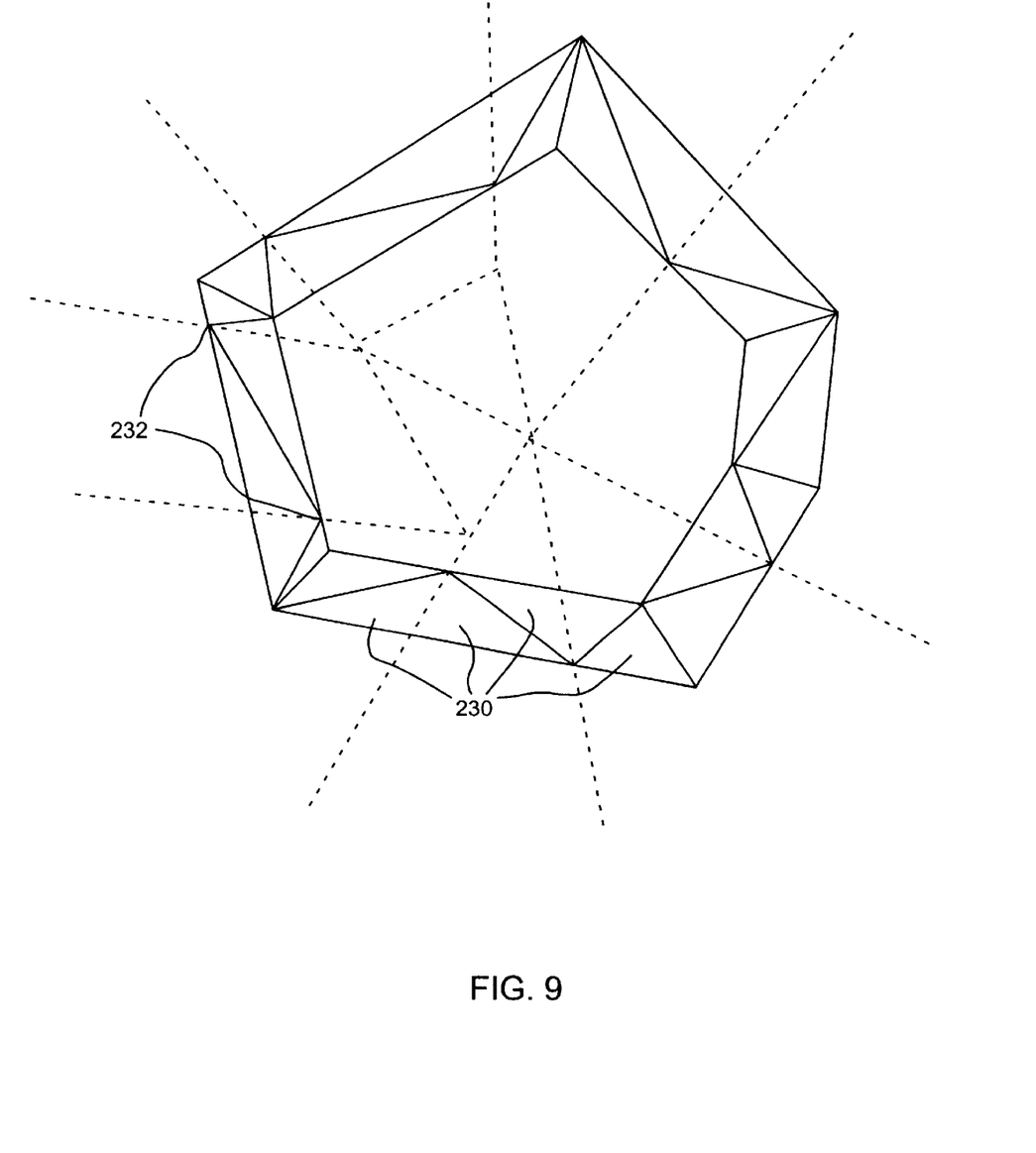
FIG. 9 illustrates a skirt surrounding an inset geometry that is divided into clipped skirt fragments.

Once the opening in the background geometry is formed, FIG. 9 illustrates that the skirt polygons are clipped against the background polygons they overlay in block 204 (FIG. 6). This generates a set of skirt fragments 230, each of which is entirely contained within one background polygon. In other words, the skirt fragments will be equal in size or smaller than the background polygons in which they are contained and the points at which the background polygons intersect the skirt 232 help define where the fragments will be divided. In most cases, the set of clipped skirt fragments will be greater in number than the original set of skirt fragments. These skirt fragments are not in a plane but will generally conform to the background against which they were clipped and as modified by the blending.

Once the skirt polygons are clipped against the background polygons, updated vertex coordinates 232 in the projection direction are computed for the clipped skirt fragment polygons as in 206 (FIG. 6). In the case of a vertical projection direction, this means that new Z or altitude components for the skirt fragments can be computed. The computed component values can be a blend of at least one background attribute and at least one inset attribute at the skirt vertex, where these attributes might include geometry, shading, texture and color data. The blend factor can be based on the relative lateral location of each fragment vertex in the skirt. In other words, vertices on the outside edge of the skirt receive 100% background behavior, vertices on the inside edge of the skirt receive 100% inset behavior, and vertices in between get an appropriate blend of the two. The clipped and conformed skirt thus becomes an integration or transition region between background behavior and inset behavior.

Figure 10:
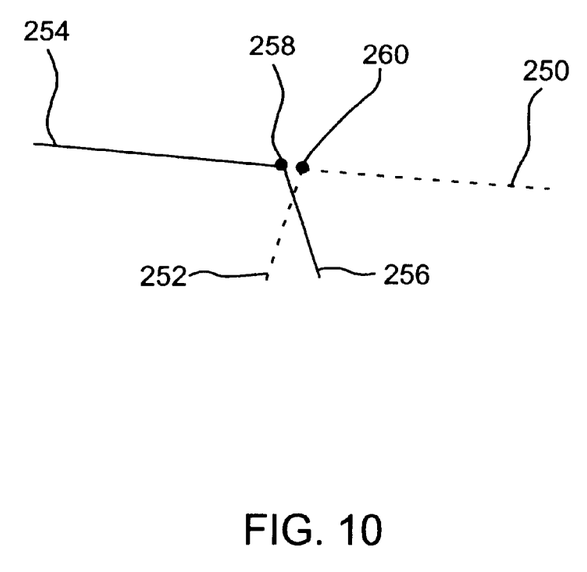
FIG. 10 depicts a cross-section view of the polygon skirt and inset terrain and their accompanying walls that are beneath the visible surface of the model.

FIG. 10 illustrates that a first drop wall 252 of polygons beneath the visible surface of the model is constructed (208 in FIG. 6) after the new vertex coordinates are computed. The top vertices 260 of the drop wall polygons are shared with the original perimeter vertices of the inset geometry. The bottom vertices of these polygons are shifted outward slightly and their visible sides face outward from the inset geometry. As illustrated in FIG. 10, the wall polygons are below the nominal "surface" which means that the drop wall is not visible to the end user.

The next step is creating a second drop wall of polygons in 210. Once the first wall is constructed, a second drop wall of polygons 256 is then constructed and its top vertices are shared with the clipped skirt fragment vertices 258 along the perimeter. The bottom vertices of these polygons are shifted slightly inward and their visible sides face inward. At this point, the system then renders all the resultant polygons.

These two walls are geometrically coincident along their top edge, but they do not have the same number of polygons, and do not share all vertices. This is significant because the points that join the first and second drop walls to either the inset geometry or background geometry are separate points. This means that although the top vertices of the drop walls are intended to be located at the same numerical point (or along the same geometric edge), the points may shift slightly when the geometry is rotated or translated for viewing. Such shifting is caused by numerical or quantization inaccuracies that are created by a finite accuracy floating point system. In other words, at certain points in time the floating point calculation may be slightly inaccurate and the points 258, 260 will be slightly separated. This allows a user to see the backdrop or error in the geometric model. Not only does the intersection of these two drop walls prevent cracks when there is a lateral separation between the geometries, it also prevents cracks when there is a vertical separation or inaccuracy. This prevents an end user from seeing between or under the perimeter that joins the skirt and inset geometry.

The clipped skirt polygons share vertices exactly with the cutter polygons along the outside perimeter, preventing visual cracks along the boundary between the background geometry and the skirt. The first set of drop wall polygons shares vertices exactly with the inside edge of the skirt, and a second set of wall polygons shares vertices exactly with the outside edge of the original inset. Since the walls intersect geometrically (due to the shift of their bottom vertices), any potential visual cracks along the boundary between the original inset and the inside edge of the skirt are geometrically closed off, even if the coincident points 258, 260 are momentarily not coincident. The result is the visually seamless insertion of one area of geometry inside another without any visual anomalies or cracks.

Because the inset can have a variable level-of-detail, the skirt and drop wall polygons derived from the inset will also have a variable level-of-detail. In addition, the wall polygons can be constructed so that they are just large enough to cover any potential crack. In general, this means that the height of each wall polygon is computed to subtend about a pixel. This process takes into account the distance of each original inset perimeter vertex from the eye, and computes a vertical drop for the corresponding wall bottom vertex that will (after perspective transformation) cause it to be about one pixel below, so that the wall polygon at that same position is about one pixel high. This minimizes the pixel fill-rate cost of the unseen wall polygons.

The cutter polygon or polygons form a hole in the background geometry that exactly accommodates the geometry of the inset geometry. If the underlying areas are not properly concealed, defects are shown during the actual display of the image. As mentioned, these defects can cause visual problems for users who view the final output. These defects include shifts in the polygon boundaries that expose light or the color of any backdrop layer, i.e. a "crack" that lets whatever is behind show through erroneously.

The defects can also provide discontinuities that are affected by the virtual instrumentation utilized within the simulation environment. For example, an infrared sensor may detect visual errors as a temperature difference between the desired geometry and the cracks, which can significantly distort the function and information provided to the user during the simulation. This can result in serious errors in performance and training. Further, bright spots may occur that are aesthetically unappealing during the training exercise and actually become distracting to the students utilizing the simulation environment. Since the process of generating images is often done at a rate of 60+ images per second, as the geometry is shifted during the simulation exercise, flickering may occur that distracts the student as well as provides false information to the virtual instrumentation utilized within a simulation system.

Accordingly, it is important to cover these regions of possible cracks to prevent their inclusion during a simulation event. The approach of the present invention utilizes vertical walls of polygons constructed along the inner edge of the skirt, which can extend several meters below ground within the global terrain. Since the walls are vertical, they are easily constructed in an automatic fashion from the vertices defining the inner edge of the clipped skirt. To complement this wall, a modeled in place, sloping, below-ground wall is generated as part of the inset geometry. This structure is not clipped to the terrain, but provides a region of double coverage that is large enough to close off any cracks completely. Further, these "below ground" structures will not frequently be seen during the display operation, so they are simplified by omitting texture or shading finesse.

An example of how this system can be used is in a flight or vehicle simulator. For example, an airport terrain insert may be desired at a specific point in a global geometry. The present invention allows the airport to be inserted without modifying or recompiling the global geometry. There may also be errors included in the modeling of the airport insert that is desired to be added in real time. The local detail, however, must be matched up along the cut or skirt boundary and divided into versions that can be manipulated to match along the boundary. This matching becomes more difficult if the airport position must be adjusted at run time in order to get each of the several runway thresholds at the right place. The present invention can overcome these problems using a skirt to allow the airport insert geometry to be adjusted slightly to allow the boundaries to match-up without creating visual anomalies.

It is to be understood that the above-referenced arrangements are illustrative of the application for the principles of the present invention. Numerous modifications and alternative arrangements can be devised without departing from the spirit and scope of the present invention while the present invention has been shown in the drawings and described above in connection with the exemplary embodiment(s) of the invention. It will be apparent to those of ordinary skill in the art that numerous modifications can be made without departing from the principles and concepts of the invention as set forth in the claims.

What is claimed is:

1. A method for integrating an inset geometry within a background geometry, comprising:

identifying a perimeter of the inset geometry;

preparing a polygon skirt generally conforming to the perimeter of the inset geometry and extending out over the background geometry;

clipping the geometry of the polygon skirt against the background geometry;

providing a first polygon wall having shared top vertices with the perimeter of the inset geometry and located beneath the surface of the inset geometry, where bottom vertices of the first polygon wall are shifted outward from the inset geometry; and providing a second polygon wall with top vertices shared with the polygon skirt and the bottom vertices shifted inward toward the inset geometry, whereby any gaps are concealed between the inset geometry and the background geometry during display.

2. A method as in claim 1, further comprising the step of constructing a cutter polygon that matches the outside perimeter of the polygon skirt and the cutter polygon is configured to remove polygons within the cutter polygon's perimeter from the background geometry.

3. A method as in claim 1, further comprising the step of clipping polygons in the polygon skirt against polygons from the background geometry, so that the skirt polygons overlay to form clipped skirt fragments which are each contained within a background polygon.

4. A method as in claim 3, further comprising the step of computing modified vertex coordinates for the clipped skirt fragments based on a blend factor that includes a relative lateral location of vertex coordinates with respect to the polygon skirt.

5. A method as in claim 3, further comprising the step of computing modified vertex coordinates for the clipped skirt fragments based on a blend factor between background geometry points and inset geometry points.

6. A method as in claim 1, further comprising the step of displaying the inset geometry within the background geometry.

7. A method as in claim 1, further comprising the step of aligning the first polygon wall and second polygon wall so that top edges of the first and second polygon walls are coincident but vertices are not shared.

\* \* \* \* \*